United States Patent [19]

Grimes et al.

[11] 4,444,072
[45] Apr. 24, 1984

[54] SHIFT MECHANISM WITH A NEUTRAL STOP CONTROL FOR A TWO-SPEED TRANSMISSION

[75] Inventors: Michael P. Grimes, Ypsilanti; William J. Vukovich, Pittsfield Township, Washtenaw County, both of Mich.

[73] Assignee: General Motors Corporation, Detroit, Mich.

[21] Appl. No.: 373,348

[22] Filed: Apr. 30, 1982

[51] Int. Cl.³ .................. F16H 3/08; F16H 53/06; G05G 1/04; B60K 20/00
[52] U.S. Cl. ..................... 74/473 R; 74/365; 74/526; 74/569; 74/475; 192/84 R
[58] Field of Search ............ 74/473 R, 365, 475, 74/569, 526; 192/84 R

[56] References Cited

U.S. PATENT DOCUMENTS

| | | | |
|---|---|---|---|
| 2,477,589 | 8/1949 | Du Shane | 74/526 |
| 2,755,679 | 7/1956 | Nallinger | 74/365 |
| 2,774,251 | 12/1956 | Price | 74/365 |
| 3,130,596 | 4/1964 | Gorski | 74/365 |
| 3,463,027 | 8/1969 | Gelb | 74/365 |
| 3,770,924 | 11/1973 | Hipple et al. | 74/569 X |
| 3,945,477 | 3/1976 | Maucher et al. | 74/475 X |

Primary Examiner—Allan D. Herrmann
Assistant Examiner—Bruce F. Wojciechowski
Attorney, Agent, or Firm—Donald F. Scherer

[57] ABSTRACT

A shift mechanism for a two-speed countershaft type transmission is operable to move the shift rail in response to a rotary input drive motor. The shift mechanism includes a control mechanism which ensures that the rotation of the drive motor will stop when the neutral position is effected during a gear interchange prior to completion of a shift so that normal gear synchronizing will occur. The control mechanism includes a rotatable plate having a slotted portion which includes stop surfaces at the neutral position. The stop surfaces are engaged during gear interchange by a pin member which must be selectively moved prior to completion of the gear interchange. Selective movement of the pin member is controlled by a solenoid mechanism.

2 Claims, 3 Drawing Figures

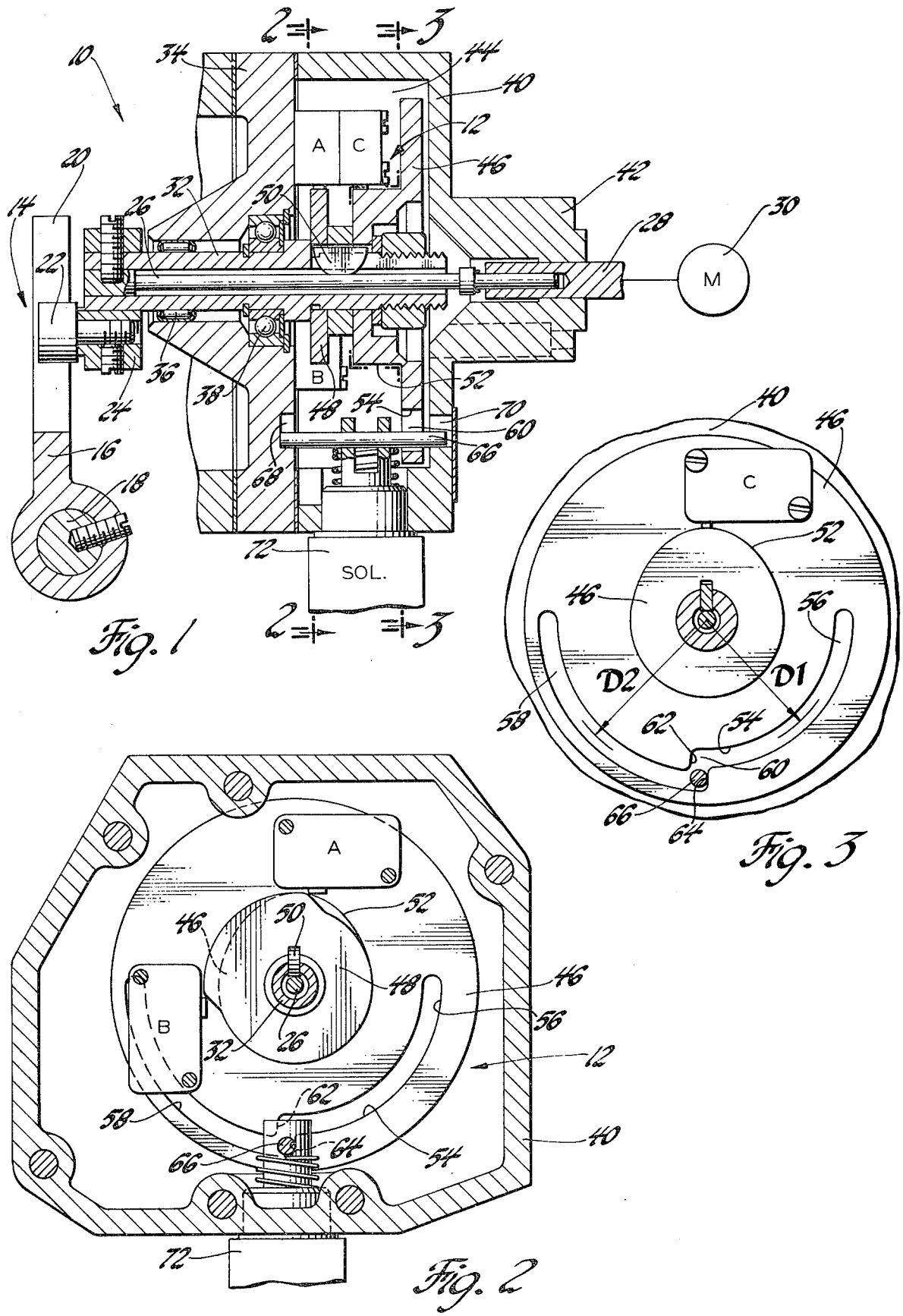
U.S. Patent    Apr. 24, 1984    4,444,072

SHIFT MECHANISM WITH A NEUTRAL STOP CONTROL FOR A TWO-SPEED TRANSMISSION

This invention relates to transmission shift controls and more particularly to transmission shift controls wherein the shift mechanism passes through a neutral condition during gear ratio interchange.

The use of electric drive motors in passenger vehicles is becoming more and more prominent. While it is possible to control the vehicle speed range by use of the motor speed range only, it is preferable to supply at least a two-speed transmission to obtain an increased speed range for the vehicle. The shifting of a two-speed transmission with an electric drive motor requires that the neutral position be maintained especially during upshifting to provide sufficient time for the drive motor speed to be adjusted downwardly. If this shift time is not provided, the inertia of the drive motor is absorbed by the synchronizing mechanism in the transmission or results in gear clash during shifting. The present invention provides a control mechanism utilized with the transmission shift mechanism to ensure a positive neutral condition during ratio interchange.

It is, therefore, an object of this invention to provide an improved shift mechanism having a positive neutral control mechanism to ensure that the neutral position is held for a predetermined time during a ratio interchange.

It is another object of this invention to provide an improved transmission shift mechanism having a control mechanism to ensure a positive neutral condition wherein the control mechanism includes a rotatable slotted plate member having a pair of stop surfaces which are engaged or abutted during the neutral condition by a pin member which is movable in response to a selectively operable solenoid prior to completion of a ratio change.

These and other objects and advantages of the present invention will be more apparent from the following description and drawings in which:

FIG. 1 is an elevational sectional view showing a portion of a transmission shift mechanism;

FIG. 2 is a view taken along line 2—2 of FIG. 1; and

FIG. 3 is a view taken along line 3—3 of FIG. 1.

Referring to the drawings, wherein like characters represent the same or corresponding parts throughout the several views, there is seen in FIG. 1 a transmission shift mechanism, generally designated 10, which includes a neutral control portion, generally designated 12, and a mechanical shift portion, generally designated 14. The mechanical shift portion 14 includes a shift yoke 16 to which is secured a transmission shift rail 18. The shift rail 18 operates in a well-known manner to manipulate the synchronizers in a two-speed countershaft type transmission, not shown. Such synchronizing mechanisms and their mechanical inputs are well-known and in order to maintain brevity will not be described in detail at this time.

The shift yoke 16 has a slotted portion 20 in which is disposed a roller member 22 which is secured to an arm 24. The arm 24 is drivingly connected to a shaft 26 which in turn is driven by a shaft 28. The shaft 28 is driven by a conventional electric motor designated 30. The arm 24 is driven through an arcuate path in a well-known manner such that shift rail 18 will be moved longitudinally to accomplish the conventional shift function.

The electric motor 30, in determining the shift sequence, can be controlled by the operator or by an automatic electronic shift control. Both such electric motor control mechanisms are believed conventional and readily apparent to those skilled in the art.

The arm 24 is also connected to a sleeve shaft 32 which surrounds the shaft 26 and is rotatable in unisom therewith. The sleeve shaft 32 is rotatably supported in a housing 34 by a pair of bearings 36 and 38. The housing 34 has secured thereto a housing 40 which has a boss portion 42 in which the shaft 28 is rotatably supported.

The housing 40 has a central cavity 44 in which is disposed the neutral control portion 12. The neutral control portion 12 includes a plate member 46 and a cam member 48, both of which are drivingly connected through a key 50 with the sleeve shaft 32. Therefore, the plate 46 and cam 48 will be rotated by the electric motor 30. However, the shaft 26 which is disposed between the motor 30 and shaft 32 will permit some torsional resiliency to be available within the neutral control portion 12.

The plate 46 has a cam portion 52 and a slotted portion 54. The slotted portion 54 has a pair of arcuate slots 56 and 58 disposed at distances D1 and D2, respectively, from the center of sleeve shaft 32. The arcuate slots 56 and 58 are connected by a radial slot 60 which cooperates with slot 56 to form a stop surface 62 and with slot 58 to form a stop surface 64.

A pin member 66 is disposed in the slotted portion 54 and is also guided in the housings 34 and 40 by recesses 68 and 70, respectively. The recesses 68 and 70 permit radial movement of pin 66 relative to plate 46 but will not allow angular movement of the pin relative to the housings 34 and 40. The pin 66 is controlled by a selectively operable solenoid 72 which is operable to move the pin 66 in a radial direction relative to plate 46. The solenoid is preferably controlled by the shift control mechanism be it manual or automatic and incorporates a time lag which will ensure that the shift mechanism will reside in neutral for a predetermined period during ratio interchange.

The plate 46 is rotated during shifting such that in first gear, the pin will be disposed in slot 56 and in second gear, the pin 66 will be disposed in slot 58. When the transmission is in neutral, the pin 66 will be disposed in slot 60. During a ratio interchange from first to second, the plate 46 is rotated in a counterclockwise direction until the pin 66 abuts the stop surface 62 thereby causing the shift mechanism to reside in neutral. The arrival in neutral is signified by an electric switch C which is actuated by the cam surface 52. The solenoid 74 is then actuated to move the pin 66 from abutting relationship with stop surface 62 to alignment with slot 58. When this occurs, further counterclockwise rotation of plate 46 can take place thereby completing the ratio interchange to second gear. The accomplishment of second gear is signalled by an electric switch B which is actuated by the surface of cam 48. First gear in the transmission is signalled through the actuation of a switch A by the cam surface 48. A downshift ratio change from second to first is merely the reverse of the above described upshift ratio change. Briefly, the plate 46 is rotated clockwise until pin 66 abuts surface 64 after which the pin 66 is moved radially inward for alignment with the slot 56 so that the downshift ratio interchange can be completed.

It is possible that the torque and inertia of motor 30 might cause some binding between pin 66 and stop surfaces 62 or 64. This binding can be relieved by either slight reversal of motor 30 or otherwise momentarily releasing the torque on shaft 28 after the neutral position is achieved. Since the switch C signals neutral position, the operation of motor 30 can be altered by this signal. The amount of time spent in the neutral condition is determined by the operation of solenoid 72. This shift time can be made to correspond to the required acceleration or deceleration of the vehicle drive motor, not shown. Such electrical control functions are well-known.

It will be apparent from the foregoing description that the positive neutral condition is achieved and that this neutral condition can be maintained until the vehicle drive train is conditioned to accomplish the completion of the ratio interchange. This will prevent the absorption of excess shift energy by the gear synchronizers or by the members of the gear train proper.

The embodiments of the invention in which an exclusive property or privilege is claimed are defined as follows:

1. An improvement in transmission shift mechanisms having a mechanical shift mechanism driven by an electric motor for operation between two transmission ratios with a neutral position intermediate the two ratios wherein the improvement comprises; plate means rotatable with said electric motor; slot means formed in said plate means including a first circumferentially extending slot at one diameter, a second circumferentially extending slot at another diameter and an interconnecting radial slot interconnecting the first and second circumferentially extending slots and cooperating therewith to form first and second stop surfaces circumferentially aligned with the first and second circumferentially extending slots respectively; pin means disposed in said slot means and being selectively aligned for abutment with said first and second stop surfaces to stop said plate means and the electric motor at neutral during a ratio change; and solenoid means for selectively positioning said pin means in said slot means.

2. An improvement in transmission shift mechanisms having a mechanical shift mechanism driven by an electric motor for operation between two transmission ratios with a neutral position intermediate the two ratios wherein the improvement comprises; plate means rotatable with said electric motor; slot means formed in said plate means including a first arcuate slot formed at one diameter, a second arcuate slot formed at another diameter and a slot interconnecting the first and second arcuate slots and cooperating therewith to form respective first and second stop surfaces aligned with the first and second arcuate slots respectively to establish a neutral position; pin means disposed in said slot means and being selectively aligned for abutment with said first and second stop surfaces to stop said plate means in the neutral position during a ratio change; and solenoid means for selectively moving said pin means in said slot means for permitting completion of the shift interchange by aligning said pin means with the appropriate arcuate slot.

* * * * *